(12) United States Patent
Zhang

(10) Patent No.: US 9,150,236 B2
(45) Date of Patent: Oct. 6, 2015

(54) BRAKING MECHANISM AND CHILD CARRIER THEREWITH

(71) Applicant: Zhongjie Zhang, Guangdong (CN)

(72) Inventor: Zhongjie Zhang, Guangdong (CN)

(73) Assignee: Wonderland Nurserygoods Company Limited, Kwai Chung (HK)

( * ) Notice: Subject to any disclaimer, the term of this patent is extended or adjusted under 35 U.S.C. 154(b) by 70 days.

(21) Appl. No.: 13/760,033

(22) Filed: Feb. 5, 2013

(65) Prior Publication Data

US 2013/0248302 A1 Sep. 26, 2013

(30) Foreign Application Priority Data

Mar. 26, 2012 (CN) .......................... 2012 1 0083459

(51) Int. Cl.
*B62B 9/08* (2006.01)
*B62B 5/04* (2006.01)

(52) U.S. Cl.
CPC .............. *B62B 9/082* (2013.01); *B62B 5/0433* (2013.01); *B62B 5/0461* (2013.01); *B62B 9/087* (2013.01)

(58) Field of Classification Search
CPC .......... B62B 9/082; B62B 9/08; B62B 9/087; B62B 5/0433; B62B 5/0461
USPC ......................... 188/19–22, 31; D12/129–132
See application file for complete search history.

(56) References Cited

U.S. PATENT DOCUMENTS

| | | | | |
|---|---|---|---|---|
| 4,618,033 A * | 10/1986 | Kassai | ............................. | 188/20 |
| 5,191,675 A * | 3/1993 | Ishikura | ......................... | 16/35 R |
| 7,175,004 B2 * | 2/2007 | Kassai et al. | ..................... | 188/31 |
| 7,537,093 B2 * | 5/2009 | Chen | ................................ | 188/20 |
| 8,418,816 B2 * | 4/2013 | Chen | ................................ | 188/20 |
| 8,540,059 B2 * | 9/2013 | Li et al. | ............................ | 188/20 |
| 8,596,421 B2 * | 12/2013 | Park | ................................ | 188/19 |
| 2004/0178025 A1 * | 9/2004 | Zweideck | ........................ | 188/2 F |
| 2005/0006185 A1 * | 1/2005 | Kassai et al. | ..................... | 188/19 |
| 2006/0151259 A1 * | 7/2006 | Tomasi et al. | .................... | 188/31 |
| 2007/0045055 A1 * | 3/2007 | Lan | ................................. | 188/20 |
| 2013/0180805 A1 * | 7/2013 | Cheng | ............................. | 188/20 |
| 2013/0320641 A1 * | 12/2013 | Zhang | ........................ | 280/47.38 |

FOREIGN PATENT DOCUMENTS

EP      2065289 A2 *  6/2009   ............... B62B 9/08

* cited by examiner

*Primary Examiner* — Thomas Irvin
(74) *Attorney, Agent, or Firm* — Winston Hsu; Scott Margo

(57) ABSTRACT

A braking mechanism includes a base, a braking treadle and a resilient member. The base is connected to the foot assembly. The braking treadle is pivoted to the base. The braking treadle includes an engaging slot disposed on a lateral wall corresponding to the braking hub, and the engaging slot separately engages with the braking hub. An end of the resilient member is connected to the braking treadle, and the other end of the resilient member is connected to the base. If the braking hub abuts against an edge of the engaging slot during the recovery of the resilient member, the braking hub does not engage with the engaging slot completely. The braking hub can re-engage with the engaging slot only by slightly rotating the wheel due to the resilient member. Accordingly, the braking mechanism can achieve braking and prevent the fake-braking issue, so as to enhance reliability and safety.

14 Claims, 8 Drawing Sheets

BRAKING MECHANISM AND CHILD CARRIER THEREWITH

BACKGROUND OF THE INVENTION

1. Field of the Invention

The present invention relates to a braking mechanism and a child carrier therewith, and more particularly, to a braking mechanism capable of preventing fake-braking and a child carrier therewith.

2. Description of the Prior Art

Child carriers, such as dining chairs, cribs, strollers, three-wheeled bicycles, are equipped with wheels and braking mechanisms for braking the wheels of the child carriers. The braking mechanisms on the strollers are highly emphasized since the strollers are often used outdoors. For example, the braking mechanisms on the strollers are used for stopping movement of the strollers, fixing the strollers, or constraining the stroller from moving on a ramp. In order to prevent the stroller from sliding, a reliable braking mechanism on the stroller is a critical issue of safety for a child sitting in the stroller. The braking mechanism of the conventional stroller includes a braking base installed on a shaft and a braking treadle pivoted to the braking base. The wheel includes a plurality of braking tooth members, and a plurality of braking slots is formed among the braking tooth members. A braking member is disposed on the braking treadle corresponding to the braking slots. When the braking treadle is trod, the braking treadle rotates relative to the braking base. Thus, the braking member is embedded inside the braking slot, and meanwhile the wheel is incapable of rotating. When the braking treadle is lifted, the braking member exits the braking slot, such that the wheel is freely rotated.

However, the above-mentioned braking mechanism often generates fake-braking, resulting in safety concerns of the stroller. Practically, the tip of the braking tooth member might abut against the braking member during braking process, so that the braking member is incapable of being completely embedded inside the braking slot. Since the tip of the braking tooth member stops the braking treadle, it misleads that the wheel is locked. Alternatively, although the braking member is embedded inside the braking slot, there is no force firmly applied to ensure the embedding. Accordingly, the braking member could separate from the braking slot once the braking member is touched by objects. Furthermore, it will cause danger for a child when the stroller is on the ramp.

SUMMARY OF THE INVENTION

The present invention provides a braking mechanism capable of preventing fake-braking and a child carrier therewith for solving above drawbacks.

According to one embodiment of the present invention, a braking mechanism is installed on a child carrier. The child carrier includes a foot assembly and a wheel pivoted to the foot assembly. The wheel includes a braking hub, and the braking mechanism includes a base, a braking treadle and a resilient member. The base is connected to the foot assembly and corresponds to the braking hub. The braking treadle is pivoted to an end of the base. A pivoting point is a connection to which the braking treadle and the base are pivoted. The braking treadle includes an engaging slot disposed on a lateral wall thereof corresponding to the braking hub. The engaging slot separately engages with the braking hub. An end of the resilient member is connected to the braking treadle, the other end of the resilient member is connected to the base. A first connecting point is a connection to which the resilient member and the braking treadle are connected. A second connecting point is a connection to which the resilient member and the base are connected. The first connecting point and the second connecting point define a straight line. The resilient member drives the braking treadle to rotate to the base when the first connecting point deviates from the straight line.

According to another embodiment of the present invention, a maximum force is applied on the resilient member when the first connecting point is rotated to be on the straight line.

According to another embodiment of the present invention, the resilient member drives the braking treadle to rotate to the base when the first connecting point downwardly deviates from the straight line, so as to drive the engaging slot to engage with the braking hub.

According to another embodiment of the present invention, the base includes a braking base and a connecting shaft. The connecting shaft is connected to the foot assembly and the wheel. The braking base corresponds to the braking hub and is connected to the connecting shaft. The braking treadle is pivoted to an end of the braking base. The pivoting point is a connection to which the braking treadle and the braking base are pivoted. The resilient member drives the braking treadle to rotate to the braking base when the first connecting point deviates from the straight line.

According to another embodiment of the present invention, the second connecting point is a connection to which the resilient member and the braking base are connected.

According to another embodiment of the present invention, the second connecting point is a connection to which the resilient member and the connecting shaft are connected.

According to another embodiment of the present invention, the braking base includes a positioning protrusion for engaging with the braking treadle, so as to position the braking treadle.

According to another embodiment of the present invention, a connecting hole is formed on the braking base. A pivoting portion protrudes from a front end of the braking base. The braking base is connected to the connecting shaft via the connecting hole, and the pivoting portion is pivoted to the braking treadle.

According to another embodiment of the present invention, the positioning protrusion is disposed in a position near the pivoting portion and between the pivoting portion and the connecting hole. The positioning protrusion is higher than the connecting hole relative to a bottom edge of the braking base.

According to another embodiment of the present invention, the braking treadle is a hollow structure. The braking treadle includes a first positioning slot and a second positioning slot. The first positioning slot and the second positioning slot are disposed on a front end of a lateral wall of the braking treadle, the pivoting portion of the braking base is inserted into the hollow structure for pivoting to the braking treadle, and the positioning protrusion is for selectively engaging with the first positioning slot or the second positioning slot.

According to another embodiment of the present invention, a fixing hole is formed on a lateral wall of the braking treadle, and the end of the resilient member is connected to the fixing hole.

According to another embodiment of the present invention, the braking base includes a fixing portion protruding from a position corresponding to the connecting hole, and the other end of the resilient member is connected to the fixing portion.

According to another embodiment of the present invention, a fixing slot passing through the connecting hole is formed on the fixing portion, and the resilient member is contained inside the fixing slot.

According to another embodiment of the present invention, the resilient member is an arc-shaped structure.

According to another embodiment of the present invention, the resilient member extends from a lateral wall of the braking treadle, so as to form the arc-shaped structure.

According to another embodiment of the present invention, the resilient member is a torsion spring.

According to another embodiment of the present invention, a child carrier includes a foot assembly, a wheel, a braking hub and a braking mechanism. The wheel is pivoted to the foot assembly. The braking hub is disposed on the wheel. The braking mechanism includes a base, a braking treadle and a resilient member. The base is connected to the foot assembly and corresponds to the braking hub. The braking treadle is pivoted to an end of the base. A pivoting point is a connection to which the braking treadle and the base are pivoted. The braking treadle includes an engaging slot disposed on a lateral wall thereof corresponding to the braking hub. The engaging slot separately engages with the braking hub. An end of the resilient member is connected to the braking treadle, the other end of the resilient member is connected to the base. A first connecting point is a connection to which the resilient member and the braking treadle are connected. A second connecting point is a connection to which the resilient member and the base are connected. The first connecting point and the second connecting point define a straight line. The resilient member drives the braking treadle to rotate to the base when the first connecting point deviates from the straight line.

According to another embodiment of the present invention, the braking hub includes a plurality of braking tooth members spaced one another. The plurality of braking tooth members is uniformly arranged in a radial direction of the braking hub. The braking tooth member is engaged inside the corresponding engaging slot for braking the wheel and the foot assembly.

Compared to the prior art, the braking mechanism of the present invention includes the base, the braking treadle and the resilient member. The end of the resilient member is connected to the braking treadle, and the other end of the resilient member is connected to the base. Thus, during the pivoting of the braking treadle, the resilient member is stretched first and then recovered. During the recovery of the resilient member, the resilient member drives the braking treadle to rotate to the base, so as to achieve a braking position. If the braking hub abuts against the lateral side of the engaging slot, resulting in incomplete engagement inside the engaging slot, the wheel only needs to be slightly rotated to make the braking hub completely engage inside the engaging slot due to the resilient member. As a result, the braking mechanism and the child carrier therewith of the present invention can prevent fake-braking when the braking mechanism is used for braking the child carrier, so as to enhance reliability and safety.

These and other objectives of the present invention will no doubt become obvious to those of ordinary skill in the art after reading the following detailed description of the preferred embodiment that is illustrated in the various figures and drawings.

DETAILED DESCRIPTION

Referring to the embodiment of the present invention illustrated in figures, components with identical denotations have identical structures and functions. The braking mechanism of the present invention is adapted to a child carrier with wheels, and the following descriptions illustrates that the braking mechanism of the present invention is disposed on a stroller with embodiments. Similarly, the braking mechanism of the present invention can be adapted to other child carrier, such as a three-wheeled bicycle, a dining chair, a crib and so on.

A braking mechanism 2 of the present invention is installed on a foot assembly of a child carrier, not shown in figures, for locking a wheel on the child carrier. The wheel is connected to the foot assembly by utilizing a wheel shaft, and the braking mechanism 2 is connected to the foot assembly by utilizing a connecting shaft. Preferably, the wheel and the braking mechanism 2 are connected to each other by utilizing the same shaft. In other words, the wheel is pivoted to the connecting shaft, and the connecting shaft is further connected to the foot assembly. Furthermore, the braking mechanism 2 is connected to the connecting shaft and corresponds to the wheel. The above-mentioned ways of connection are known to those skilled in the art, and further description is omitted herein for simplicity.

The description for the child carrier with the braking mechanism of the present invention is illustrated with embodiments and figures. In this embodiment, a wheel 12 and the braking mechanism 2 are connected to a connecting shaft 11. Other structures of the child carrier are known to those skilled in the art, and further description is omitted herein for simplicity.

Figure 1:
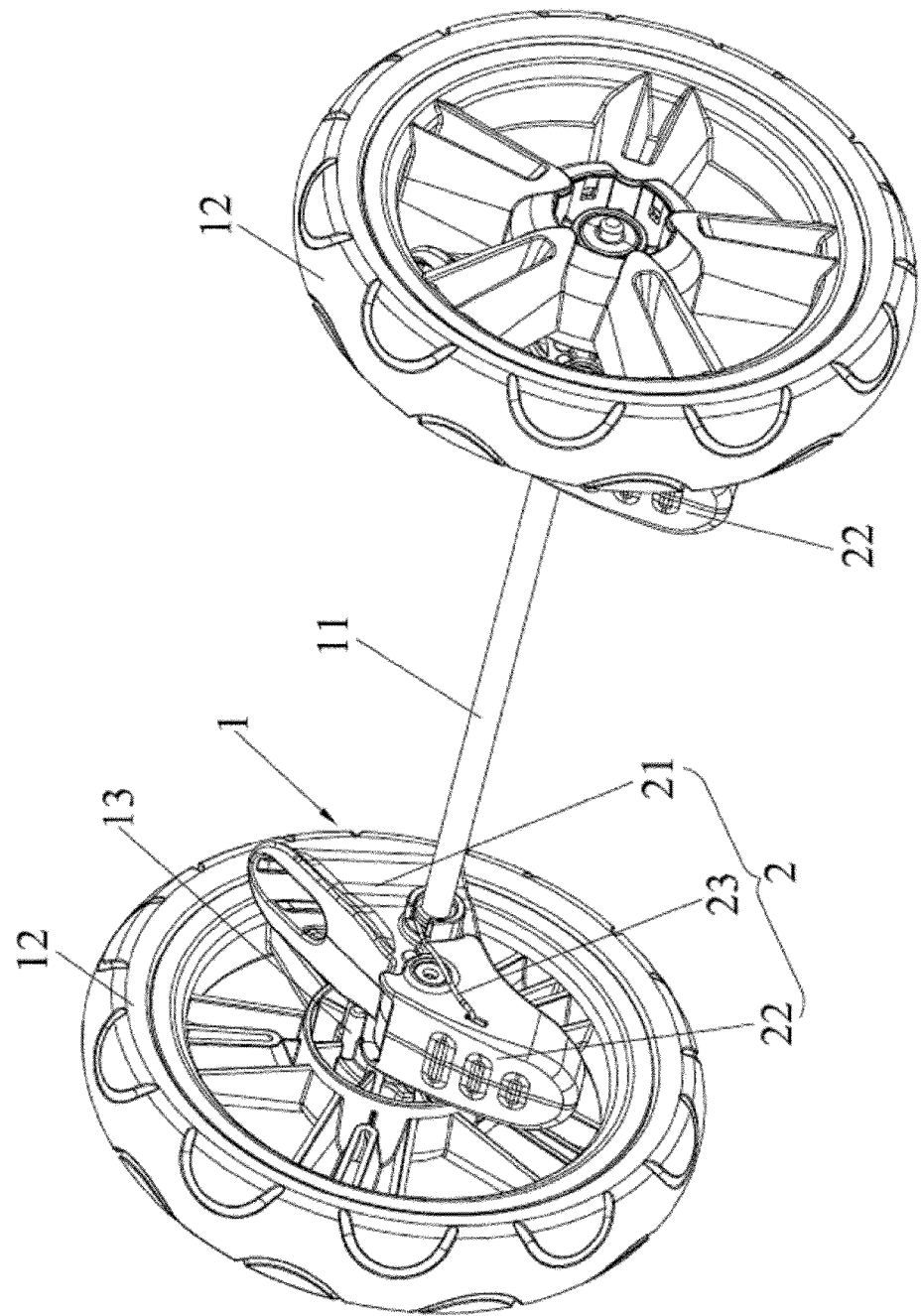
FIG. 1 is a diagram of a braking mechanism installed on a wheel assembly according to an embodiment of the present invention.

As shown in FIG. 1, the child carrier of the present invention includes a wheel assembly 1 and a braking mechanism 2. The wheel assembly 1 includes a connecting shaft 11, a wheel 12 and a braking hub 13. The braking hub 13 is disposed on a middle portion of the wheel 12. When the wheel 12 is connected to the connecting shaft 11, two ends of the connecting shaft 11 are respectively disposed through a middle portion of the braking hub 13, so that the wheel 12 is connected to the connecting shaft 11 in a rotable manner. In this embodiment, the braking hubs 13 are respectively disposed on an inner side of the wheel 12 and face each other. Comprehensively, the two wheels 12 can be respectively installed on two sides of the child carrier by independently utilizing two connecting shafts 11. In order to brake the wheel assembly 1, the child carrier further includes a braking mechanism 2 connected to the connecting shaft 11. In this embodiment, there are two braking mechanisms 2 corresponding to the two wheels 12. Practically, the two braking mechanisms 2 respectively correspond to the braking hubs 13 of the two wheels 12 and are connected to two ends of the connecting shaft 11. In other words, the two braking mechanisms 2 are disposed between the two wheels 12. Comprehensively, if the child carrier adopts the embodiment that one connecting shaft 11 is installed on one wheel 12, the braking mechanism 2 can be installed on the side of the wheel 12 with the braking hub 13. In this embodiment, the structure and the principle of the two braking mechanisms 2 are identical. Thus, the following description only illustrates the structure and the braking principle for one of the two braking mechanisms 2.

Figure 2:
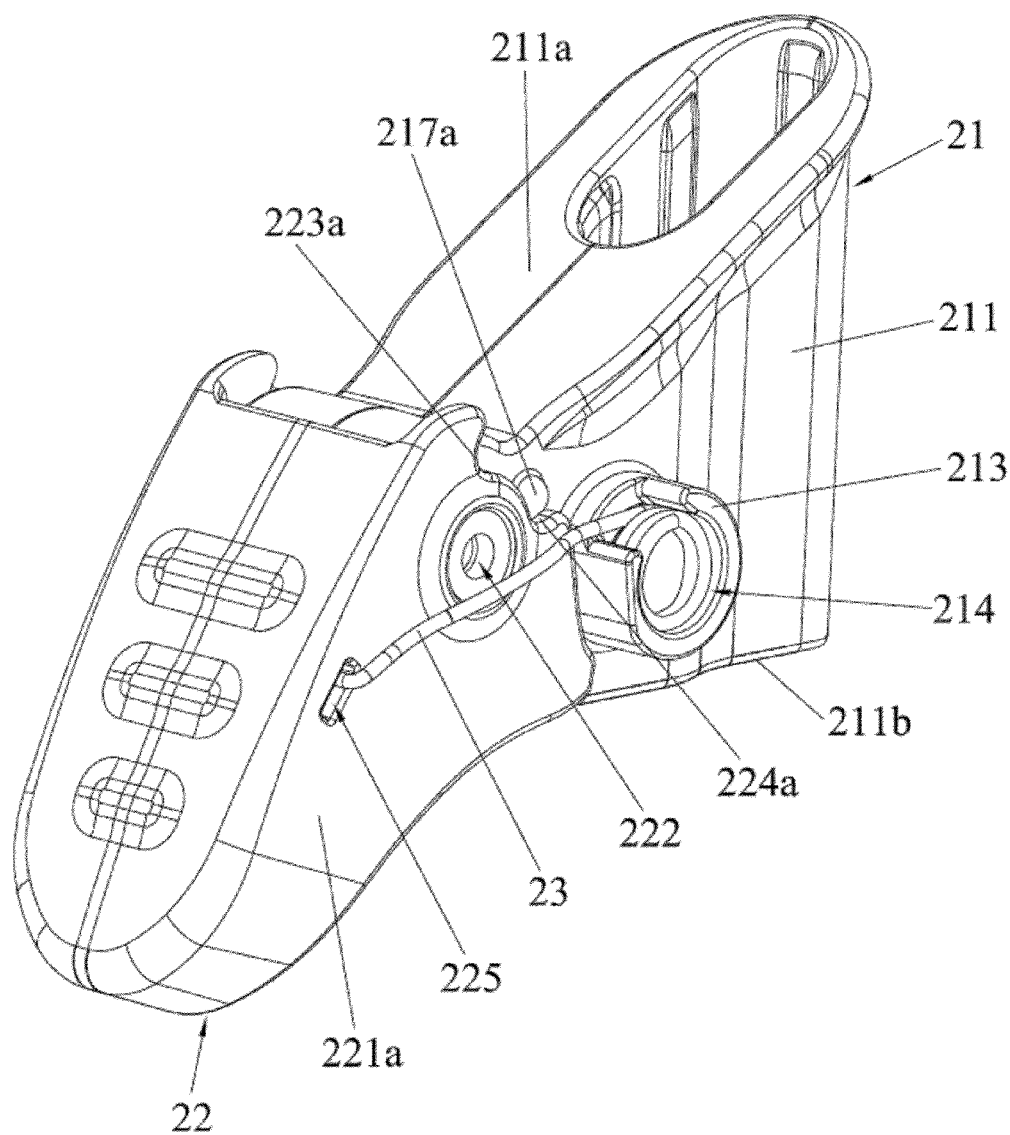
FIG. 2 is an enlarged diagram of the braking mechanism according to the embodiment of the present invention.

As shown in FIG. 1 and FIG. 2, the braking mechanism 2 includes a base, a braking treadle 22 and a resilient member 23. In this embodiment, the base only includes a braking base 21, and the resilient member 23 is an arc-shaped structure. The braking base 21 is connected to the connecting shaft 11, and a rear end of the braking base 21 extends in a direction perpendicular to the connecting shaft 11. The braking treadle 22 is pivoted to a front end of the braking base 21, and the braking treadle 22 extends from the braking base 21 in a direction opposite to the direction that the rear end of the braking base 21 extends. The braking treadle 22 corresponds to the braking hub 13. The braking treadle 22 is separately engaged with a lateral wall of the braking hub 13, so as to lock or release the braking mechanism 2. An end of the resilient member 23 is connected to a lateral wall 221a of the braking treadle 22, and the other end of the resilient member 23 is selectively connected to the connecting shaft 11 or the braking base 21. In this embodiment, the other end of the resilient member 23 is connected to the connecting shaft 11. As a result, the braking treadle 22 can engage with or separate from the braking hub 13 by pivoting of the braking treadle 22, so as to lock or release the braking mechanism 2. In this embodiment, the resilient member is preferably a resilient steel wire 23. The implementation of the resilient member is not limited to those mentioned in this embodiment, i.e. the resilient steel wire 23. For example, it can be members with resilience, such as a spring, a rubber member, a rubber dome, a torsion spring and so on.

Figure 3:
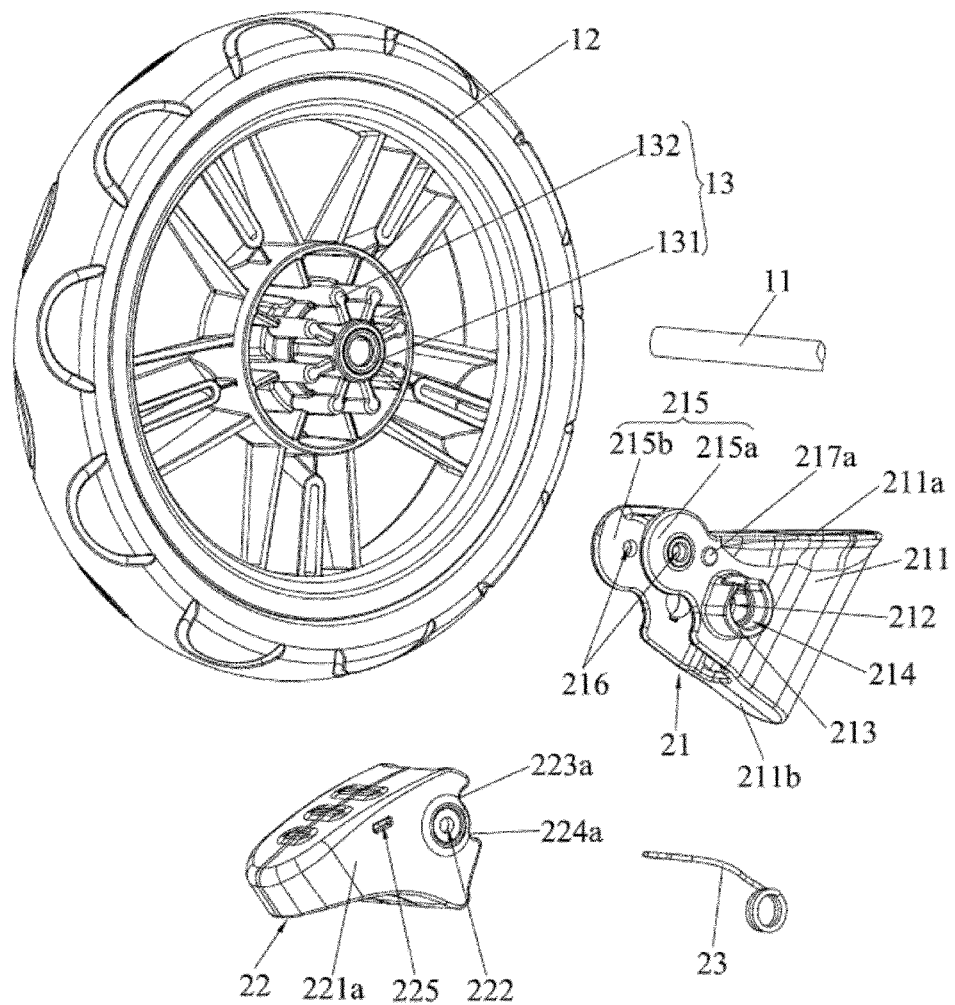
FIG. 3 is an exploded diagram of the braking mechanism according to the embodiment of the present invention.

As shown in FIG. 3, the braking hub 13 includes a connecting portion 131, and the connecting portion 131 is a hollow ring structure. A plurality of braking tooth members 132 is disposed on an outer periphery of the connecting portion 131, and the plurality of braking tooth members 132 are uniformly spaced in a radial direction of the connecting portion 131. The connecting shaft 11 is disposed through the connecting portion 131 and connected to the wheel 12.

Figure 4:
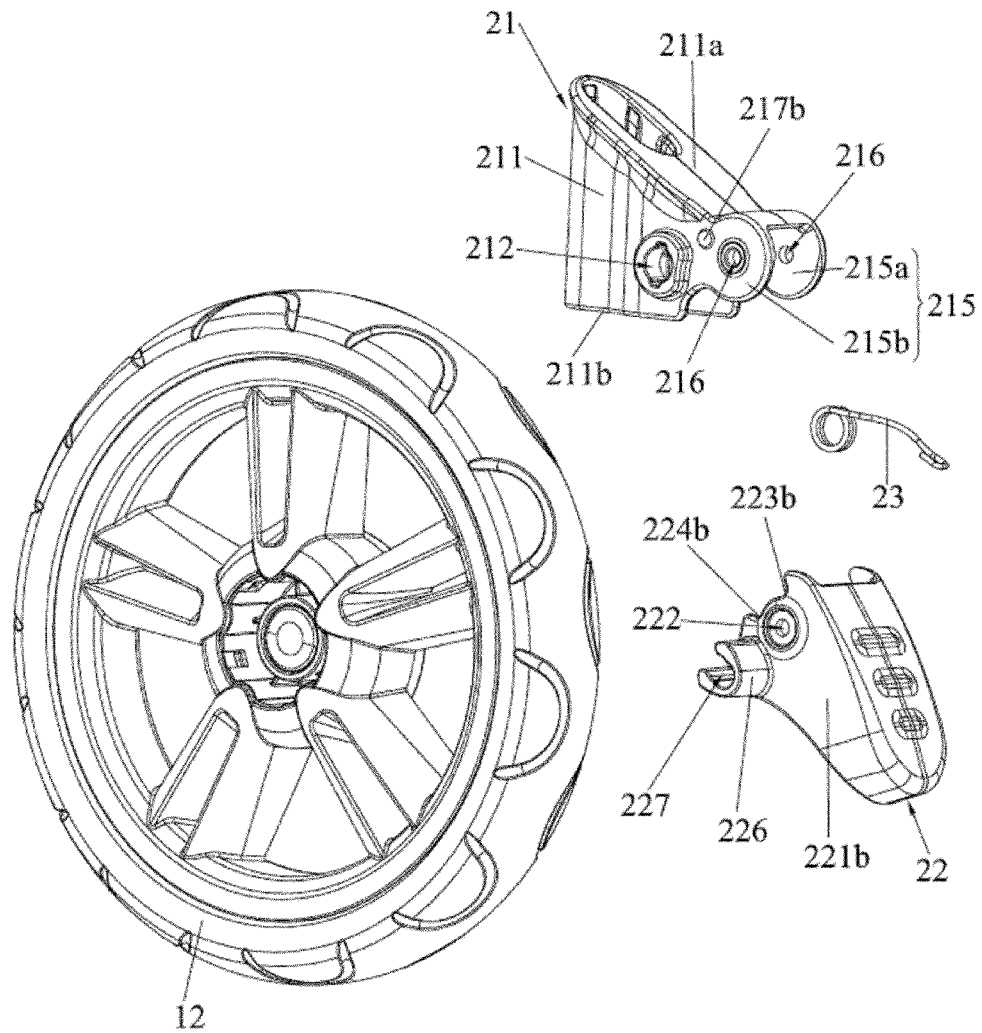
FIG. 4 is an exploded diagram of the braking mechanism in another view according to the embodiment of the present invention.

As shown in FIG. 3 and FIG. 4, the braking base 21 includes a body 211 with an upper edge 211a and a bottom edge 211b relative to the upper edge 211a. A connecting hole 212 is formed on the body 211 of the braking base 21, and the connecting hole 212 is through two sides of the body 211. The connecting hole 212 is located in a position near the front end of the body 211. The braking base 21 is connected to the connecting shaft 11 via the connecting hole 212. A pivoting portion 215 protrudes from a front end of the body 211. Practically, the pivoting portion 215 includes two pivoting members 215a, 215b, the pivoting member 215a faces the pivoting member 215b. A first pivoting hole 216 is formed on the two pivoting members 215a, 215b, and an axis direction of the first pivoting hole 216 is identical to an axis direction of the connecting hole 212. Two positioning protrusions 217a, 217b protrude from a position the pivoting members 215a, 215b, and the positioning protrusion 217a corresponds the positioning protrusion 217b. The positioning protrusions 217a, 217b are located between the first pivoting hole 216 and the connecting hole 212. The positioning protrusions 217a, 217b are higher than the first pivoting hole 216 relative to the bottom edge 211b of the body 211. A fixing portion 213 protrudes from the body 211 and is located in a position corresponding to the connecting hole 212. A fixing slot 214 passing through the connecting hole 212 is formed on the fixing portion 213, and the fixing slot 214 is used for containing the resilient member 23. When the braking base 21 is connected to the connecting shaft 11, the connecting shaft 11 is disposed through the connecting hole 212 for connecting the braking base 21, and the rear end of the braking base 21 extends to a side of the wheel assembly 1. The pivoting portion 215 on the front end of the braking base 21 is pivoted to the braking treadle 22 via the first pivoting hole 216.

As shown in FIG. 3 and FIG. 4, the braking treadle 22 is a hollow structure, and an opening communicating with the hollow structure is formed on the front end of the braking treadle 22. Furthermore, the braking treadle 22 has two corresponding lateral walls 221a, 221b. The braking treadle 22 includes two first positioning slots 223a, 223b and two second positioning slots 224a, 224b caved in and formed on the lateral walls 221a, 221b in a position corresponding to the opening, and the first positioning slots 223a, 223b are located above the second positioning slots 224a, 224b. Arc-shaped openings are formed between the first positioning slots 223a, 223b and the second positioning slots 224a, 224b. The first positioning slots 223a, 223b are used for positioning the braking treadle 22 when the braking mechanism 2 is in a released status. The second positioning slots 224a, 224b are used for positioning the braking treadle 22 when the braking mechanism 2 is in a locked status. A second pivoting hole 222 is penetratingly formed on the lateral walls 221a, 221b of the braking treadle 22. The second pivoting hole 222 is located between the first positioning slots 223a, 223b and the second positioning slots 224a, 224b. In addition, a fixing hole 225 is formed on the lateral wall 221a. The fixing hole 225 is disposed on the middle portion of the braking treadle 22 and located in a position near the upper edge of the braking treadle 22. The braking treadle 22 further includes an engaging portion 226 protruding from the lateral wall 221b. The engaging portion 226 is substantially perpendicular to the lateral wall 221b of the braking treadle 22, and the engaging portion 226 is disposed in a position near the bottom edge of the braking treadle 22. In other words, the engaging portion 226 is located below the second pivoting hole 222. An engaging slot 227 is formed on the engaging portion 226 for separately engaging with the braking tooth members 132 of the braking hub 13. When the braking treadle 22 is connected to the braking base 21, the pivoting portion 215 of the braking base 21 is inserted into the hollow structure via the opening of the braking treadle 22, so that the first pivoting hole 216 on the pivoting portion 215 is aligned with the second pivoting hole 222 on the braking treadle 22. A pivotal shaft, not shown in figures, is disposed through the first pivoting hole 216 and the second pivoting hole 222 for pivoting the braking treadle 22 to the braking base 21. When the positioning protrusions 217a, 217b engage with the first positioning slots 223a, 223b, the braking mechanism 2 is in the released status. When the positioning protrusions 217a, 217b engage with the second positioning slots 224a, 224b, the braking mechanism 2 is in the locked status. The positioning protrusions 217a, 217b are used for constraining pivoting of the braking treadle 22.

Figure 5:
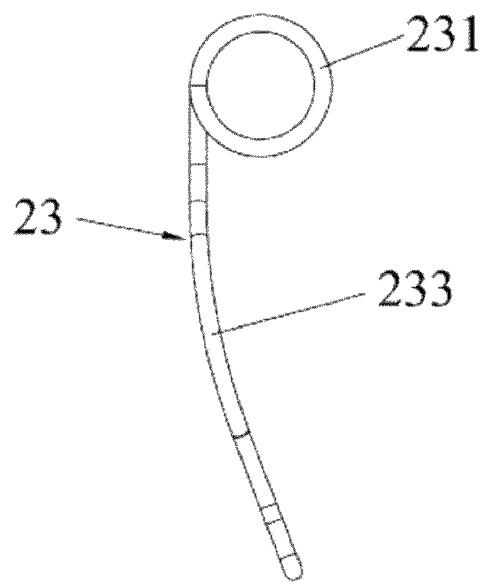
FIG. 5 is a diagram of a resilient member shown in FIG. 4.
Figure 6:
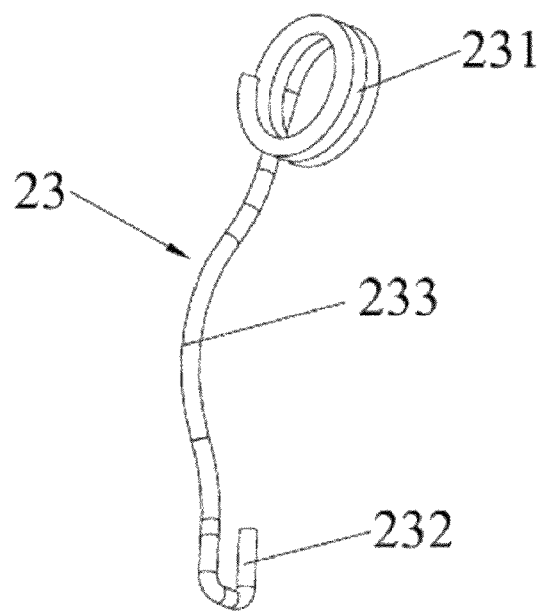
FIG. 6 is a diagram of the resilient member shown in FIG. 4 in another view.

As shown in FIG. 5 and FIG. 6, the resilient steel wire 23 is an arc-shaped structure. Furthermore, the resilient steel wire 23 includes a first fixing portion 231 curled on an end and a second fixing portion 232 bent on the other end. The resilient steel wire 23 further includes an arc portion 233 curved in the middle portion. When the resilient steel wire 23 is connected to the braking treadle 22 and the braking base 21, the first fixing portion 231 of the resilient steel wire 23 sheathes the connecting shaft 11 and is contained inside the fixing slot 214. The fixing slot 214 is used for preventing the resilient steel wire 23 from being over-rotated. An end of the second fixing portion 232 of the resilient steel wire 23 extends to the braking treadle 22, and the second fixing portion 232 is installed inside the fixing hole 225 on the braking treadle 22.

Figure 7:
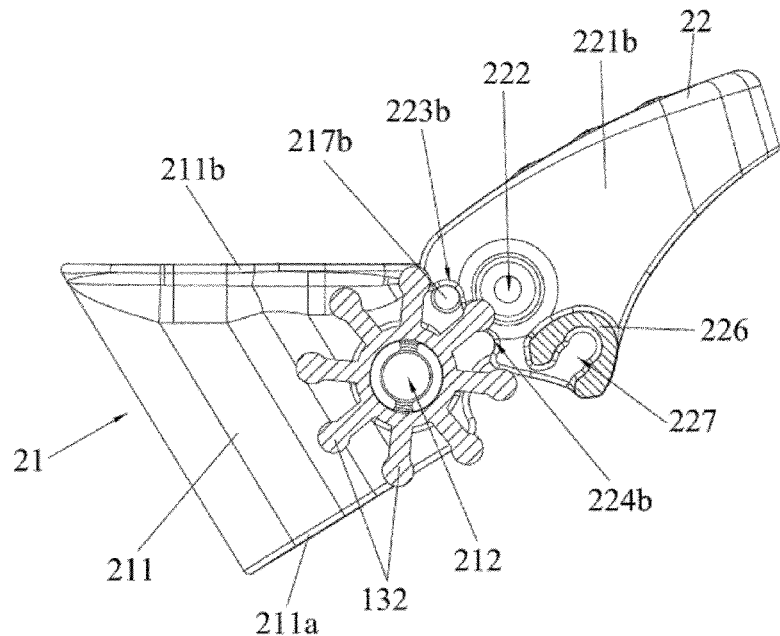
FIG. 7 is a sectional diagram of the braking mechanism in a released status according to the embodiment of the present invention.
Figure 8:
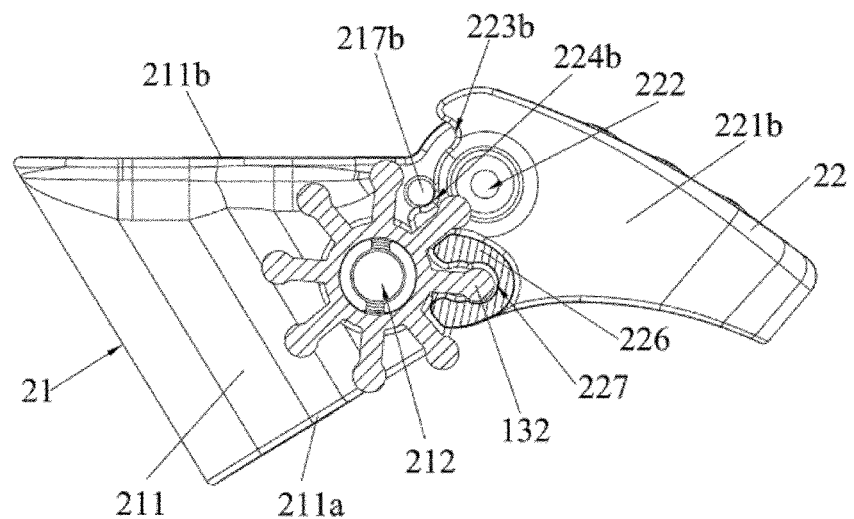
FIG. 8 is a sectional diagram of the braking mechanism in a locked status according to the embodiment of the present invention.

As shown in FIG. 7 and FIG. 8, the braking mechanism is in the locked status. The wheel assembly 1 is freely rotated, so that the stroller is movable. At the meantime, the positioning protrusion 217a on the braking base 21 engaging with the first positioning slots 223a, 223b correspondingly, and the braking tooth members 132 of the braking hub 13 separates from the engaging slot 227. When the braking treadle 22 is downwardly pivoted, the positioning protrusion 217a is moved toward the second positioning slots 224a, 224b, so as to be engage with the second positioning slots 224a, 224b. Accordingly, the braking tooth members 132 are engaged with the engaging slot 227 correspondingly. At the meantime, the braking mechanism 2 is in the locked status.

Figure 9:
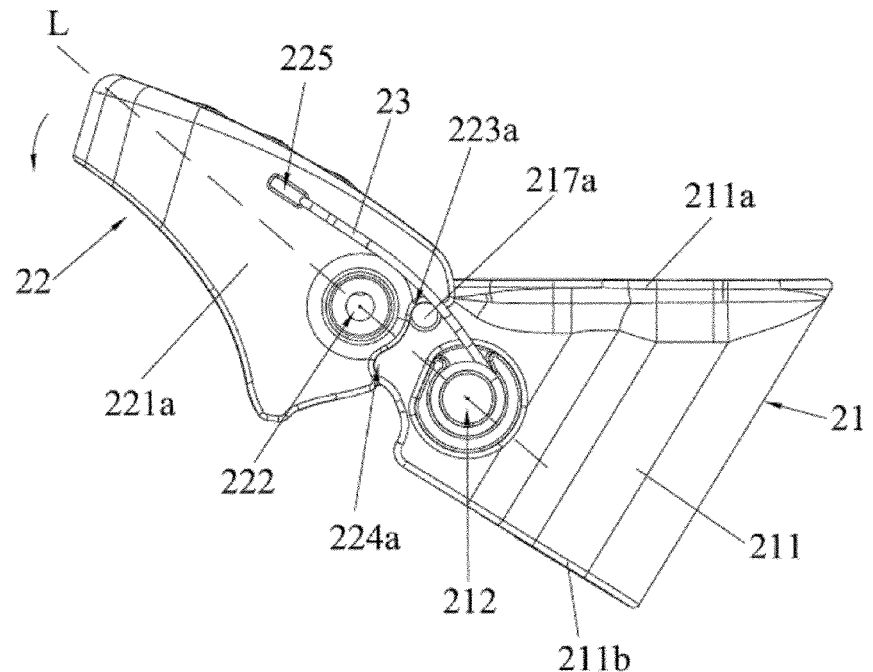
FIG. 9 is a diagram of the braking mechanism in the released status according to the embodiment of the present invention.

As shown in FIG. 7 to FIG. 11, the description for braking principle and the braking process of the braking treadle 22 is provided as follows. When the braking mechanism 2 is in the released status, the braking tooth members 132 of the braking hub 13 separates from the engaging slot 227 on the braking treadle 22, the positioning protrusions 217a, 217b respectively engage with the first positioning slots 223a, 223b. A connection to which the second fixing portion 232 of the resilient steel wire 23 and the fixing hole 225 are connected is defined as a first connecting point. A center of the connecting hole 212 on the braking base 21 is defined as a second connecting point. As a result, a pivoting point of the braking treadle 22 and the second connecting point define a straight line L. At the meantime, the first connecting point is above the straight line L, and the resilient steel wire 23 is in an initial status, as shown in FIG. 9.

Figure 10:
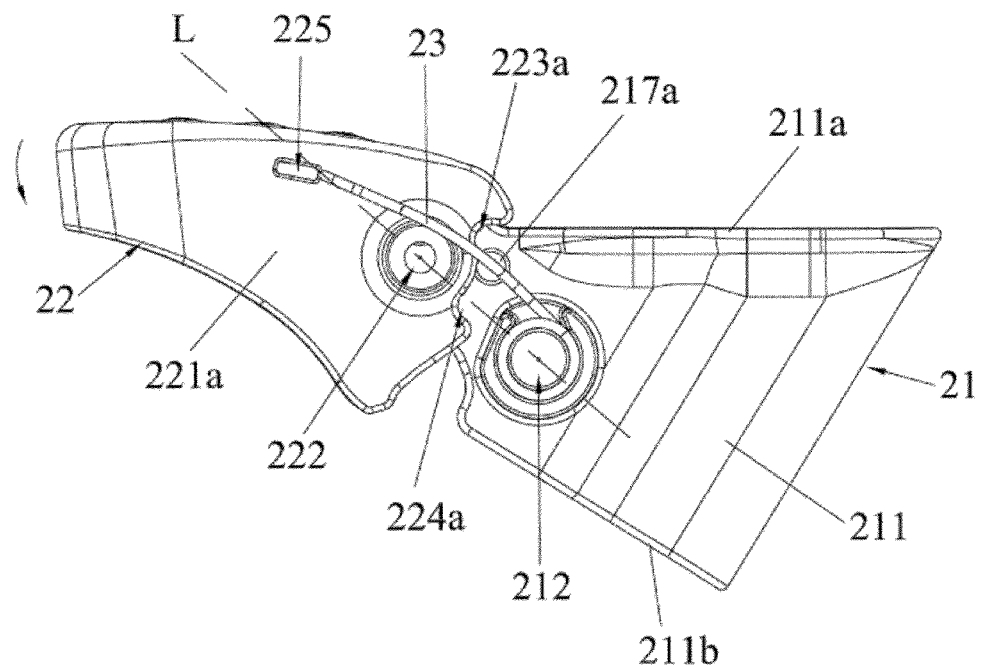
FIG. 10 is a diagram of the braking mechanism in a transient status according to the embodiment of the present invention.

When the braking is desired to be performed, the braking treadle 22 is trod to rotate downwards relative to the pivoting point, the resilient member 23 is stretched during the rotation of the braking treadle 22. In other words, the curled arc portion 233 of the resilient steel wire 23 is drawn to be straight gradually, that is, a radius of curvature corresponding to the arc portion 233 is getting bigger. When the first connecting point is rotated to be located on the straight line L, the resilient steel wire 23 achieves a maximum stretch. In other words, the curled arc portion 233 of the resilient steel wire 23 is drawn to be most straight, that is, the radius of curvature corresponding to the arc portion 233 achieves a maximum value. Furthermore, a maximum force is applied on the resilient steel wire 23. The positioning protrusions 217a, 217b separate from the first positioning slots 223a, 223b and are located between the first positioning slots 223a, 223b and the second positioning slots 224a, 224b. At the meantime, the braking mechanism 2 is in a transient status, as shown in FIG. 10.

Figure 11:
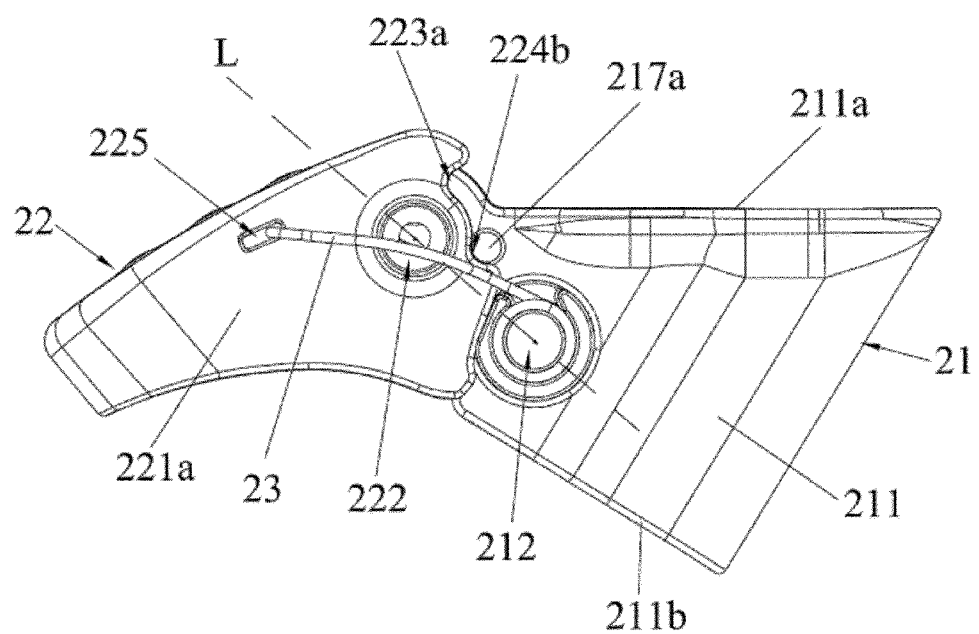
FIG. 11 is a diagram of the braking mechanism in the locked status according to the embodiment of the present invention.

When the braking treadle 22 is rotated downwards continuingly, the first connecting point is rotated to be located below the straight line L. During the above-mentioned process, resilient steel wire 23 recovers from the maximum stretch. In other words, the resilient steel wire 23 recovers from the maximum stretch to an initial curled status. During the recovery of the resilient steel wire 23, the resilient steel wire 23 continues to drive the braking treadle 22 to rotate downwards, so as to automatically rotate the braking treadle 22 to a braking position. Accordingly, one of the braking tooth members 132 of the braking hub 13 can be precisely engaged inside the engaging slot 227 on the braking treadle 22. During the above-mentioned process, if the braking hub 13 abuts against the edge of the engaging slot 227, the braking hub 13 is not engaged inside the engaging slot 227 completely. As a result, due to recovery force generated by the resilient member 23, the braking hub 13 can be re-engaged inside the engaging slot 227 only by slightly rotating the wheel 12. When the braking hub 13 is engaged inside the engaging slot 227, the positioning protrusions 217a, 217b are engaged inside the second positioning slots 224a, 224b, respectively. Furthermore, the first connecting point is located below the straight line L, and the resilient steel wire 23 is rotated to be below the pivoting point of the braking treadle 22. At the meantime, the resilient steel wire 23 applies a counterclockwise force for driving the braking treadle 22 to rotate to the braking base 21, as shown in FIG. 11.

When the release of the braking mechanism 2 is desired to be performed, the braking treadle 22 is lifted to make the braking treadle 22 rotate upwards relative to the pivoting point. During the process that the braking treadle 22 is rotated upwards, the resilient steel wire 23 is stretched again. When the first connecting point is rotated to be located on the straight line L again, the curled arc portion 233 of the resilient steel wire 23 is drawn to be most straight, that is, the radius of curvature corresponding to the arc portion 233 achieves the maximum value. Furthermore, the maximum force is applied on the resilient steel wire 23. When the resilient steel wire 23 continues to be rotated, the resilient steel wire 23 recovers. During the recovery of the resilient steel wire 23, the resilient steel wire 23 drives the braking treadle 22 to rotate upwards continuingly, so that the braking treadle 22 achieves the release status. At the meantime, the positioning protrusions 217a, 217b are engaged inside the first positioning slots 223a, 223b again, and the resilient steel wire 23 applies a clockwise force for driving the braking treadle 22 to rotate to the braking base 21.

The braking mechanism 2 of the present invention includes the braking base 21, the braking treadle 22 and the resilient member 23. The resilient member 23 is an arc-shaped structure. The braking base 21 corresponds to the braking hub 13 and is connected to the connecting shaft 11. The braking treadle 22 is pivoted to an end of the braking base 21 and corresponding to the braking hub 13. The braking treadle 22 includes the engaging slot 227 disposed on the lateral wall 221b thereof corresponding to the braking hub 13. The engaging slot 227 separately engages with the braking hub 13. The end of the resilient member 23 is fixed on the other lateral wall 221a of the braking treadle 22, and the other end of the resilient member 23 sheathes the connecting shaft 11. As a result, the braking treadle 22 is trod to be rotate, the resilient member 23 is stretched. When the braking treadle 22 continues to be trod to rotate, the resilient member 23 achieves the maximum stretch, and then the resilient member 23 recovers gradually. During the recovery of the resilient member 23, the braking treadle 22 is rotated to the braking position, so that the engaging slot 227 engages with the braking hub 13. If an issue that the braking hub 13 abuts against the edge of the engaging slot 227 occurs, the braking hub 13 does not engage with the engaging slot 227 completely. Due to recovery force generated by the resilient member 23, the braking hub 13 can re-engage with the engaging slot 227 only by slightly rotating the wheel 12, so as to achieve the braking of the braking mechanism 2. As a result, it can prevent the fake-braking issue, so as to enhance reliability and safety of the braking mechanism 2.

The implementation of the braking mechanism 2 of the present invention is not limited to the stroller. Depending on practical demands, it can be implemented in other child carriers with the wheel 12, such as a three-wheeled bicycle, a dining chair, a crib and so on. Furthermore, the braking mechanism 2 for being installed on a single-wheel mechanism or on a dual-wheel mechanism is within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A braking mechanism installed on a child carrier, the child carrier comprising a foot assembly and a wheel pivoted to the foot assembly, the wheel comprising a braking hub, the braking mechanism comprising:
    a base connected to the foot assembly and corresponding to the braking hub;
    a braking treadle pivoted to an end of the base, a pivoting point being a connection to which the braking treadle and the base are pivoted, the braking treadle comprising an engaging slot disposed on a lateral wall thereof corresponding to the braking hub, the engaging slot separately engaging with the braking hub; and
    a resilient member with an end being connected to the braking treadle, the other end of the resilient member being connected to the base, a first connecting point being a connection to which the resilient member and the braking treadle are connected, a second connecting point being a connection to which the resilient member and the base are connected, the pivoting point and the second connecting point defining a straight line, the resilient member driving the braking treadle to rotate relative to the base for enabling the braking treadle to be in an initial status when the first connecting point deviates to be located on an above side of the straight line, and the resilient member further driving the braking treadle to rotate relative to the base reversely for enabling the braking treadle to be in a braking status when the first connecting point deviates to be located on a below side of the straight line,
    wherein a maximum force is generated by the resilient member when the first connecting point is rotated to be on the straight line due to a first deformation of the resilient member, a second deformation of the resilient member occurs when the braking treadle is in the initial status, a third deformation of the resilient member occurs when the breaking treadle is in the breaking status, and the first deformation is greater than the second deformation and the third deformation,
    wherein the base comprises a braking base and a connecting shaft, the connecting shaft is connected to the foot assembly and the wheel, the braking base corresponds to the braking hub and is connected to the connecting shaft, the braking treadle is pivoted to an end of the braking base, the pivoting point is a connection to which the braking treadle and the braking base are pivoted, and the resilient member drives the braking treadle to rotate to the braking base when the first connecting point deviates from the straight line, and
    wherein the second connecting point is a connection to which the resilient member and the connecting shaft are connected.

2. The braking mechanism of claim 1, wherein the resilient member drives the braking treadle to rotate to the base when the first connecting point downwardly deviates from the straight line, so as to drive the engaging slot to engage with the braking hub.

3. The braking mechanism of claim 1, wherein the braking base comprises a positioning protrusion for engaging with the braking treadle, so as to position the braking treadle.

4. The braking mechanism of claim 3, wherein a connecting hole is formed on the braking base, a pivoting portion protrudes from a front end of the braking base, the braking base is connected to the connecting shaft via the connecting hole, and the pivoting portion is pivoted to the braking treadle.

5. The braking mechanism of claim 4, wherein the positioning protrusion is disposed in a position near the pivoting portion and between the pivoting portion and the connecting hole, and the positioning protrusion is higher than the connecting hole relative to a bottom edge of the braking base.

6. The braking mechanism of claim 5, wherein the braking treadle is a hollow structure, the braking treadle comprises a first positioning slot and a second positioning slot, the first positioning slot and the second positioning slot are disposed on a front end of a lateral wall of the braking treadle, the pivoting portion of the braking base is inserted into the hollow structure for pivoting to the braking treadle, and the positioning protrusion is for selectively engaging with the first positioning slot or the second positioning slot.

7. The braking mechanism of claim 1, wherein a fixing hole is formed on a lateral wall of the braking treadle, and the end of the resilient member is connected to the fixing hole.

8. The braking mechanism of claim 7, wherein the braking base comprises a fixing portion protruding from a position corresponding to the connecting hole, and the other end of the resilient member is connected to the fixing portion.

9. The braking mechanism of claim 8, wherein a fixing slot passing through the connecting hole is formed on the fixing portion, and the resilient member is contained inside the fixing slot.

10. The braking mechanism of claim 1, wherein the resilient member is an arc-shaped structure.

11. The braking mechanism of claim 10, wherein the resilient member extends from a lateral wall of the braking treadle, so as to form the arc-shaped structure.

12. The braking mechanism of claim 1, wherein the resilient member is a torsion spring.

13. A child carrier, comprising:
    a foot assembly;
    a wheel pivoted to the foot assembly;
    a braking hub disposed on the wheel;
    a braking mechanism, comprising:
    a base connected to the foot assembly and corresponding to the braking hub;
    a braking treadle pivoted to an end of the base, a pivoting point being a connection to which the braking treadle and the base are pivoted, the braking treadle comprising an engaging slot disposed on a lateral wall thereof corresponding to the braking hub, the engaging slot separately engaging with the braking hub; and
    a resilient member with an end being connected to the braking treadle, the other end of the resilient member being connected to the base, a first connecting point being a connection to which the resilient member and the braking treadle are connected, a second connecting point being a connection to which the resilient member and the base are connected, the pivoting point and the second connecting point defining a straight line, the resilient member driving the braking treadle to rotate relative to the base for enabling the braking treadle to be in an initial status when the first connecting point deviates to be located on an above side of the straight line, and the resilient member further driving the braking treadle to rotate relative to the base reversely for enabling the braking treadle to be in a braking status when the first connecting point deviates to be located on a below side of the straight line, wherein a maximum force is generated by the resilient member when the first connecting point is rotated to be on the straight line due to a first deformation of the resilient member, a second deformation of the resilient member occurs when the braking treadle is in the initial status, a third deformation of the resilient member occurs when the breaking treadle is in the breaking status, and the first deformation is greater than the second deformation and the third deformation, wherein the base comprises a braking base and a connecting shaft, the connecting shaft is connected to the foot assembly and the wheel, the braking base corresponds to the braking hub and is connected to the connecting shaft, the braking treadle is pivoted to an end of the braking base, the pivoting point is a connection to which the braking treadle and the braking base are pivoted, and the resilient member drives the braking treadle to rotate to the braking base when the first connecting point deviates from the straight line, and wherein the second connecting point is a connection to which the resilient member and the connecting shaft are connected.

14. The braking mechanism of claim 13, wherein the braking hub comprises a plurality of braking tooth members spaced from one another, the plurality of braking tooth members are uniformly arranged in a radial direction of the braking hub, a braking tooth member is engaged inside the corresponding engaging slot for braking the wheel and the foot assembly.

* * * * *